July 27, 1965

H. S. PIEN 3,196,676

SHEAR STRAIN TYPE FORCE MEASURING DEVICE

Filed Dec. 31, 1962

Hsia S. Pien

By *Edward P. Hathaway*

Attorney

July 27, 1965   H. S. PIEN   3,196,676
SHEAR STRAIN TYPE FORCE MEASURING DEVICE
Filed Dec. 31, 1962   2 Sheets-Sheet 2

Inventor
Hsia S. Pien
By
Attorney

United States Patent Office 3,196,676
Patented July 27, 1965

3,196,676
SHEAR STRAIN TYPE FORCE MEASURING
DEVICE
Hsia S. Pien, Newton, Mass., assignor to Baldwin-Lima-Hamilton Corporation, a corporation of Pennsylvania
Filed Dec. 31, 1962, Ser. No. 248,509
9 Claims. (Cl. 73—141)

This invention relates generally to force measuring devices of the type employing load (i.e. force) responsive strain sensitive elements, and more particularly for measuring fluid pressure forces.

In devices of the type disclosed herein the strain is measured by strain gages preferably of the bonded electrical resistance filament type. One of the problems in connection with devices of this type in certain applications is to be able to manufacture them effectively in miniaturized size. This problem has heretofore been particularly acute for lower capacities because of the extremely limited surface areas on which to bond the strain gages. A further problem has involved the difficulty of manufacturing a sensing element of very small size in an economical manner and still provide an element that is rugged and highly effective and yet has readily accessible strain surface areas upon which the gages may be mounted.

It is an object of my invention to provide an improved strain-sensitive element in a force measuring transducer that is especially adapted for low capacities and small size together with presenting a surface area that is highly effective and readily accessible for application of bonded filament type strain gages.

A further object is to provide a force measuring transducer with the above desirable qualities together with being relatively rugged and economical to manufacture for a device of this type while still obtaining a high degree of sensitivity and accuracy.

Other objects and advantages will be more apparent to those skilled in the art from the following description of the accompanying drawings in which.

Figure 1:
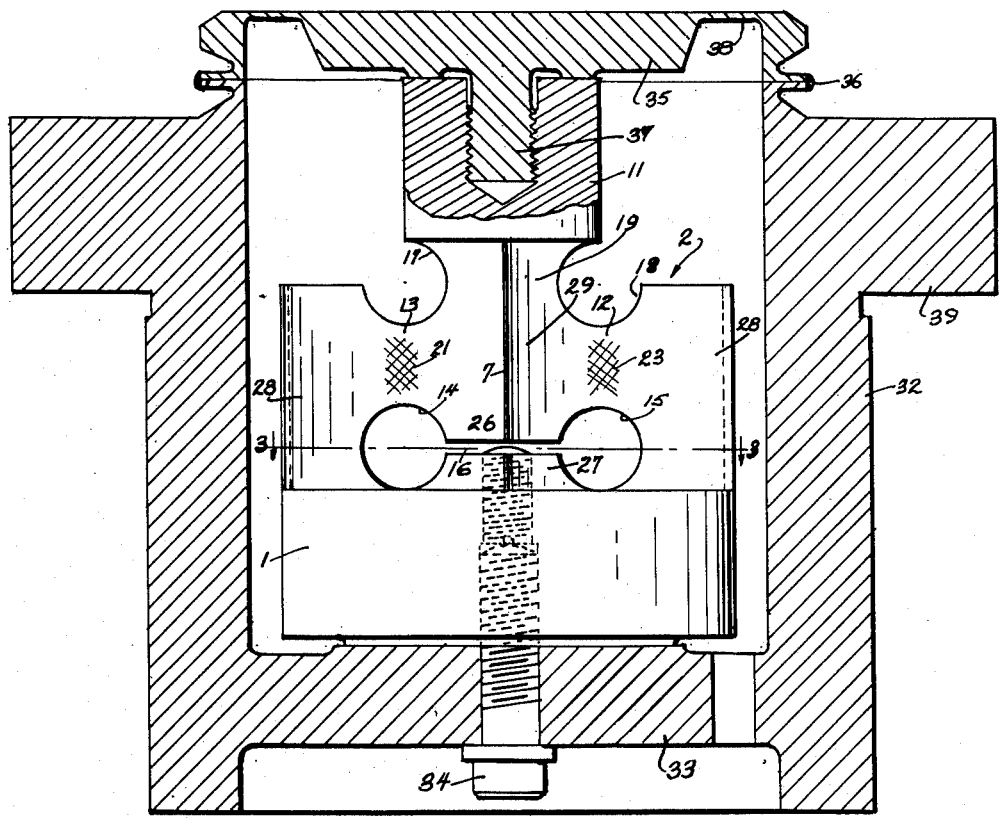
FIG. 1 is a greatly enlarged sectional view of my improved device.
Figure 2:
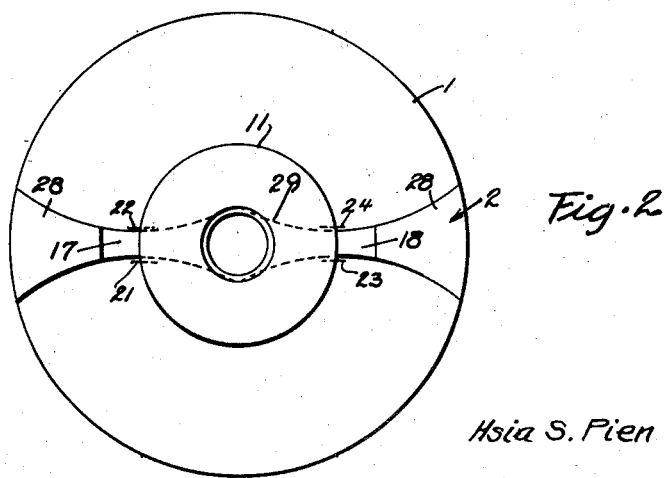
FIG. 2 is a plan view of the strain-sensitive element removed from its casing.
Figure 3:
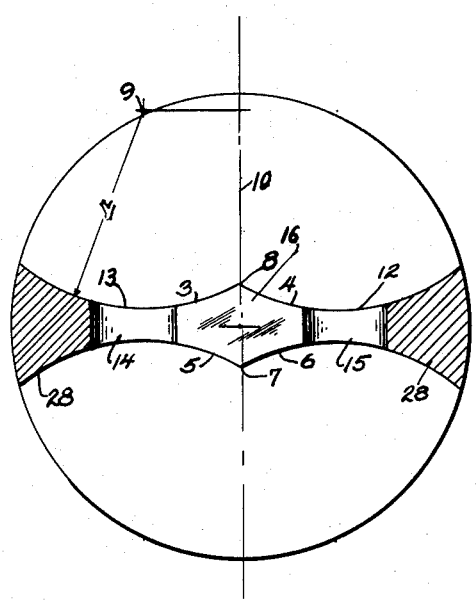
FIG. 3 is a horizontal section taken on the line 3—3 of FIG. 1.
Figure 4:
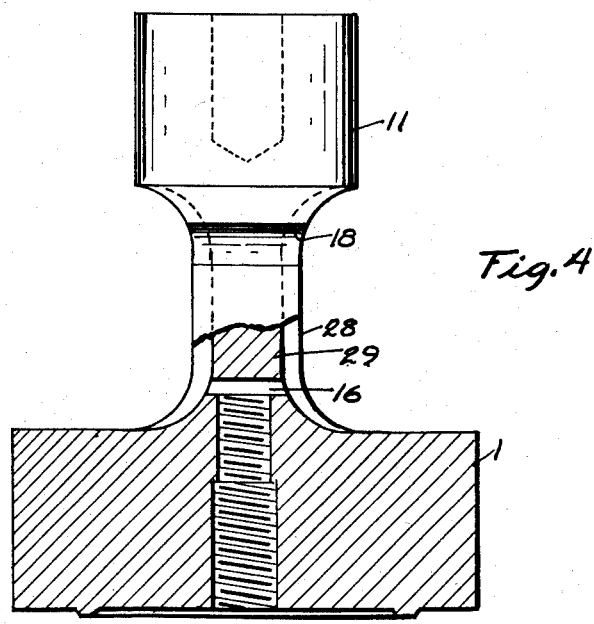
FIG. 4 is a side elevation of the load responsive element viewed from the right hand side of FIG. 3 and partly broken away to show details of construction.

My improved load responsive element is made preferably from a solid cylindrical piece of any well-known strain sensitive material whose diameter is preferably that of a base 1 which is rendered rigid by being thick in the direction of the cylindrical axis. An intermediate strain sensitive portion 2 is formed by cutting material away as shown in FIG. 3, say with a milling cutter, so as to provide preferably axially extending transversely arcuate surfaces 3, 4, 5 and 6 of radii r, each pair of such surfaces intersecting along axially extending edges 7 and 8. The centers, such as 9, of the arcs are preferably generally displaced from a center line 10 in plan view, FIG. 3, about one-half the radius of base 1 and the radii r are preferably slightly less than such radius although these various dimensions can vary depending upon the capacity of the device. Broadly, the sensitive portion in plan view is to be considered as generally of rectangular shape. The arcuate sides would actually become straight parallel sides when the radii r are infinite. The upper end of the sensitive portion 2 terminates in a cylindrical load receiving portion 11. To provide axially extending shear strain-sensitive sections 12 and 13, I drill holes 14 and 15 crosswise of the narrowest section of sensing portion 2. The centers of these holes lie in a common horizontal plane and are disposed equal distances from edges 7 and 8. These holes of the lower set are connected by a transverse slot 16 lying in a horizontal plane. For compactness the holes 14 and 15 are preferably tangent to the top of base 1. An upper set of crosswise openings or holes 17 and 18 of the same diameter as holes 14 and 15 and in axially superimposed alignment therewith are provided in the sensing element 2. The holes 17 and 18 are drilled, preferably so as to be tangent to the bottom outer edge of the load receiving portion 11, thereby to provide a neck 19. The relative positions of these upper and lower sets of holes insures that the neck 19 will transmit load forces to portions 12 and 13 so as to induce shear strains therein. Shear type strain gages 21, 22, 23 and 24, preferably of the bonded electrical resistance filament type well-known in the art, are bonded to the axially extending relatively flat arcuate surfaces of the shear areas so as to be responsive to shear strains induced by the load forces to be measured. The effect of the upper and lower set of holes and of the slot is to divide the force sensitive member into three components; one, the shear strain areas 12 and 13; two, means comprising the central axial portion beneath neck 19 for transmitting load to the shear strain areas; and three, means comprising the two portions that are spaced laterally in opposite directions from the axis and connected to the base for supporting the end portions of the sensitive member. The vertical width of slot 16 is such so as to provide safety stop portions 26 and 27 that engage each other when a load of a predetermined maximum limit is present. These stop portions are relatively heavy by the nature of my construction thus minimizing possible damage to the pressure cell.

Broadly, the strain-sensitive element 2 is a member extending axially and diametrically of its base so as to contain the vertical load axis and has outer base portions 28 and inner load receiving portions 29 connected by axially extending shear strain sections 12 and 13 upon which the gages are mounted. Then sensitive shear sections are not only readily and economically formed by the arcuate surface construction but this also allows the shear sections to be easily made of any thickness depending of the desired load capacity and at the same time provide appreciable widths of metal at their outer ends 31 to insure laterally stability and a very strong structural connection with the base 1. The inner portions 29 at edges 7 and 8 also have a widened connection with the load receiving portion 11, thereby providing an overall laterally sturdy sensing element with shear sections that are very sensitive and yet have minimum axial deformation which is desirable for measuring devices of this type.

The sensing element as above described is disposed in a housing 32, preferably a cylindrical shell, having a bottom 33 upon which base 1 is secured by a bolt 34. The upper end of the sensing element is laterally guided by a combined cover and diaphragm 35 secured at its periphery as by a bead of welding 36 to the housing and connected at its center to the sensing element by a stud 37 threaded in the load receiving portion 11. A small thin annular area 38 of the cover serves as a diaphragm to allow freedom of axial deformation of the sensing element. A flange 39 may be provided to support the pressure cell in the wall of any desired vessel or other structure against which pressure, to be measured, is exerted. It is thus seen that I have provided a force measuring device that is functionally and structurally highly effective and yet can be readily manufactured.

It will, of course, be understood that various changes in details of construction and arrangement of parts may be made by those skilled in the art without departing from the spirit of the invention, as set forth in the appended claims.

I claim:
1. A force responsive device in which a force to be measured is applied along a given axis comprising a force sensitive member extending in the direction of said axis and having at least one portion of generally rectangular shape when viewed in direction of said axis, said portion of said member being integrally connected with axially-spaced load-transmitting end portions and including a pair of rigid members integral therewith spaced laterally on opposite sides of said axis and extending from one of said end portions in direction of said axis for supporting said end portions of said member in relationship to one another, said member further including two shear strain sections integral therewith each extending laterally over between the other of said end portions and a different one of said laterally spaced supporting members and also extending axially for a predetermined distance in direction of said axis, said shear strain sections being connected with said one of said end portions only through said supporting members so as to have shear strains exhibited at the axially extending exterior surface areas thereof, and shear sensing strain gages mounted on said surface areas responding to force applied through said end portions along said axis.

2. The combination set forth in claim 1 wherein said one of said end portions includes a substantially rigid base formed integrally with the laterally spaced supporting members which is thick in the direction of said axis and is substantially coaxial of the force sensitive member, whereby said rectangular portion of said sensitive member extends substantially perpendicularly to said base.

3. The combination set forth in claim 2 wherein said base is substantially cylindrical and said rectangular portion of said sensitive member is narrower than and extends diametrically of the base, and wherein said other of said end portions includes a substantially cylindrical force transmitting member and coaxial and integral with said sensitive member, whereby the cylindrical base and force transmitting member may be machined from a solid piece of cylindrical material with the rectangular portion of the force sensitive member therebetween.

4. The combination set forth in claim 3 wherein said rigid supporting members are wider than said shear strain sections in direction normal to the diametric direction of said rectangular portion, thereby to increase the transverse support and to reduce bending of the generally rectangular portion of said sensitive member.

5. The combination set forth in claim 1 in which the supporting means and the shear strain areas are formed by substantially parallel holes extending through the sensitive member substantially normal to its axially extending surface areas and connected together by a slot, said slot having a predetermined axial dimension so that the opposing surfaces of the slot will engage each other when a predetermined force is applied to the device thereby providing a safety limit stop.

6. The combination set forth in claim 1 further provided with a substantially circular base formed as an integral part of the laterally spaced supporting means and substantially coaxial of the force sensitive member whereby said sensitive member extends diametrically of the base, and the opposite sides of the sensitive member each having arcuate surfaces that intersect along axially extending lines lying substantially in a plane which extends diametrically of the base substantially normal to the diametrical direction of the sensitive member, each end of the arcuate surfaces curving away from the diametrical direction of the sensitive member whereby a cross section of the sensitive member is thinner at two intermediate points than at its ends, and the shear strain gages being positioned at said thinner sections, the supporting means and the shear strain areas being formed by substantially parallel holes extending through the thinner sections of the sensitive member and a slot connecting the two holes.

7. The combination set forth in claim 1 wherein said surface areas of said laterally and axially extending shear strain sections lie along four cylindrically concave arcuate surfaces of said generally rectangular portion, said arcuate surfaces extending in direction of said axis in adjoining pairs on the opposite sides of said rectangular portions, the lines at which said adjoining pairs of arcuate surfaces meet extending in direction of said axis, and the curvatures of the ends of said arcuate surfaces forming a cross section of said rectangular portion which in direction transverse to said axis is thicker at the site of said axis and at the opposite ends furthest laterally from said axis than at the two sites intermediate thereto, the sections of said rectangular portion at said two intermediate sites constituting said shear strain sections, and the thicker section at the site of said axis constituting at least part of said other of said end portions.

8. The combination set forth in claim 7 wherein said shear strain sections are separated from said one of said end portions by holes extending substantially normally to the axially extending surface areas of said rectangular portion, and wherein said thicker section constituting at least part of said other of said end portions is separated from said one of said end portions by a slotted opening interconnecting said holes.

9. Apparatus responsive to fluid pressure forces comprising a housing, deformable diaphragm means supported by said housing and applying forces along a predetermined axis thereof in response to fluid pressures applied thereto, a force sensitive member having two axially spaced end portions aligned with said axis and connected respectively with said diaphragm means and said housing, said end portions being integral with an intermediate shear-sensing portion which includes two axially-elongated relatively thin shear strain sections extending from one of said end portions in opposite radial directions about said axis, said intermediate shear-sensing portion further including two axially-extending relatively thick and rigid members each integral with a different one of the radially outer ends of said shear strain sections and integral with and rigidly fixed by the other of said end portions in laterally-spaced relation to said axis, said shear strain sections and said one of said end portions being separated from said other of said end portions by an opening extending through said intermediate shear-sensing portion in direction substantially normal to the radially-extending shear strain sections, and electrical shear strain gages mounted on axially-extending exterior surfaces of said shear strain sections.

References Cited by the Examiner

UNITED STATES PATENTS

| | | | |
|---|---|---|---|
| 2,826,062 | 3/58 | Brown et al. | 73—88.5 X |
| 3,004,231 | 10/61 | Laimins | 73—88.5 X |
| 3,037,178 | 5/62 | Pien | 73—88.5 X |

OTHER REFERENCES

Rinkel, P. H.: "A Gauge for Measuring Compression Force," Journal of Scientific Instruments, pp. 298–299, November 1947.

RICHARD C. QUEISSER, *Primary Examiner.*